(12) United States Patent
Wolleschensky et al.

(10) Patent No.: US 6,747,737 B2
(45) Date of Patent: Jun. 8, 2004

(54) METHOD FOR OPTICAL DETECTION OF AN ILLUMINATED SPECIMEN IN A PLURALITY OF DETECTION CHANNELS

(75) Inventors: Ralf Wolleschensky, Schoeten (DE); Gunter Moehler, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 20 days.

(21) Appl. No.: 09/895,518

(22) Filed: Jun. 28, 2001

(65) Prior Publication Data

US 2002/0079436 A1 Jun. 27, 2002

Related U.S. Application Data

(60) Provisional application No. 60/230,344, filed on Sep. 6, 2000.

(30) Foreign Application Priority Data

Jun. 29, 2000 (DE) .......................... 100 33 179

(51) Int. Cl.$^7$ .................................. G01J 3/28
(52) U.S. Cl. ...................................... 356/326
(58) Field of Search ......................... 356/326

(56) References Cited

U.S. PATENT DOCUMENTS

| | | | |
|---|---|---|---|
| 4,786,813 A | | 11/1988 | Svanberg et al. |
| 4,844,617 A | | 7/1989 | Kelderman et al. |
| 5,192,980 A | | 3/1993 | Dixon et al. |
| 5,214,274 A | * | 5/1993 | Yang ................ 250/208.1 |
| 5,329,352 A | | 7/1994 | Jacobsen |
| 5,461,477 A | | 10/1995 | Marinelli et al. |
| 5,528,368 A | | 6/1996 | Lewis et al. |
| 5,539,517 A | | 7/1996 | Cabib et al. |
| 5,621,532 A | * | 4/1997 | Ooki et al. ............ 356/444 |
| 5,638,173 A | | 6/1997 | Smith et al. |
| 5,689,333 A | | 11/1997 | Batchelder et al. |
| 5,760,899 A | | 6/1998 | Eismann |
| 5,784,162 A | | 7/1998 | Cabib et al. |
| 5,817,462 A | | 10/1998 | Garini et al. |
| 5,886,784 A | | 3/1999 | Engelhardt |
| 6,040,907 A | | 3/2000 | Steiner et al. |
| 6,248,990 B1 | * | 6/2001 | Pyyhtia et al. ......... 250/208.1 |
| 6,337,472 B1 | | 1/2002 | Garner et al. |
| 6,441,906 B2 | * | 8/2002 | Dickopf et al. ......... 356/445 |

FOREIGN PATENT DOCUMENTS

| | | |
|---|---|---|
| AT | 394 632 | 5/1992 |
| DE | 34 32 252 A1 | 3/1986 |
| DE | 198 29 944 | 1/2000 |
| DE | 198 29 981 | 1/2000 |
| DE | 199 15 137 A1 | 10/2000 |
| DE | 296 24 210 U1 | 6/2001 |
| DE | 100 38 049 A1 | 2/2002 |
| EP | 0 548 830 A1 | 12/1992 |
| WO | WO 00/31577 | 6/2000 |
| WO | Wo 01/09592 A1 | 2/2001 |

OTHER PUBLICATIONS

English Abstract of DE 198 29 944.
English Abstract of DE 198 29 981.
Article: Robinson L. et al., "Confocal Microscopes Probe Biological Specimens" Laser Focus World, Pennwell Publishing, Tulsa, USA May 1994, pp. 215–220.
English Abstract of DE 34 32 252 A1.
English Abstract of DE 296 24 210 U1.
English Abstract of DE 199 15 137 A1.
English Abstract of DE 100 38 049 A1.
Article: "Resolution of multiple green fluorescent protein color variants and dyes using two–photon microscopy and imaging spectroscopy" Journal of Biomedical Optics Jul. 2001 vol. 6. No. 3 pp. 311–318.

* cited by examiner

Primary Examiner—F. L. Evans
Assistant Examiner—Kara Geisel
(74) Attorney, Agent, or Firm—Reed Smith LLP

(57) ABSTRACT

In light detection systems for illuminating specimens having a plurality of detection channels, particularly channels employing laser scanning microscopes, an improved method comprises assigning an upper and/or lower limiting value which is adjustable for at least one channel and changing the channel to be detected with respect to its mode of operation when the limiting value is reached.

13 Claims, 1 Drawing Sheet

METHOD FOR OPTICAL DETECTION OF AN ILLUMINATED SPECIMEN IN A PLURALITY OF DETECTION CHANNELS

CROSS-REFERENCE TO RELATED APPLICATIONS

This application claims priority of provisional application Serial No. 60/230,344, filed Sep. 6, 2000 and German Application No. 100 33 179.3, filed Jun. 29, 2000, the complete disclosure of which is hereby incorporated by reference.

BACKGROUND OF THE INVENTION

1. Field of the Invention

The invention relates to laser scanning microscopes and, in particular, the use of such lasers in a plurality of detection channels.

In laser scanning microscopes, lasers with different wavelengths are used for the illumination and excitation of specimens. The light from the specimen likewise has different wavelengths depending on the illumination and on the specimen itself (fluorescence). The light coming back from the specimen is measured and evaluated in the form of images. In an n-channel system, all channels must be evaluated in order to determine the channels in which data is actually to be detected. In microscope systems there are usually two to four recording channels that are evaluated according to images. In order to determine the channels in which light is detected, the specimen must be scanned, and accordingly also illuminated, n/4 times. This process is cumbersome and time-consuming and causes an unnecessary loading of the specimen by laser light.

2. Object and Summary of the Invention

The primary object of this invention is to overcome problems associated with the application of microscopes and, particularly, in laser scanning microscopes in multichannel detection systems. In particular, the invention aims at simplifying the known process and avoiding unnecessary loading of the specimen by laser light.

In accordance with the invention, a method for the optical detection of an illuminated specimen in a plurality of detection channels comprises assigning an upper and/or lower limiting value which is adjustable for at least one channel and changing the channel to be detected with respect to its mode of operation when the limiting value is reached

DESCRIPTION OF THE PREFERRED EMBODIMENTS

Figure 1:
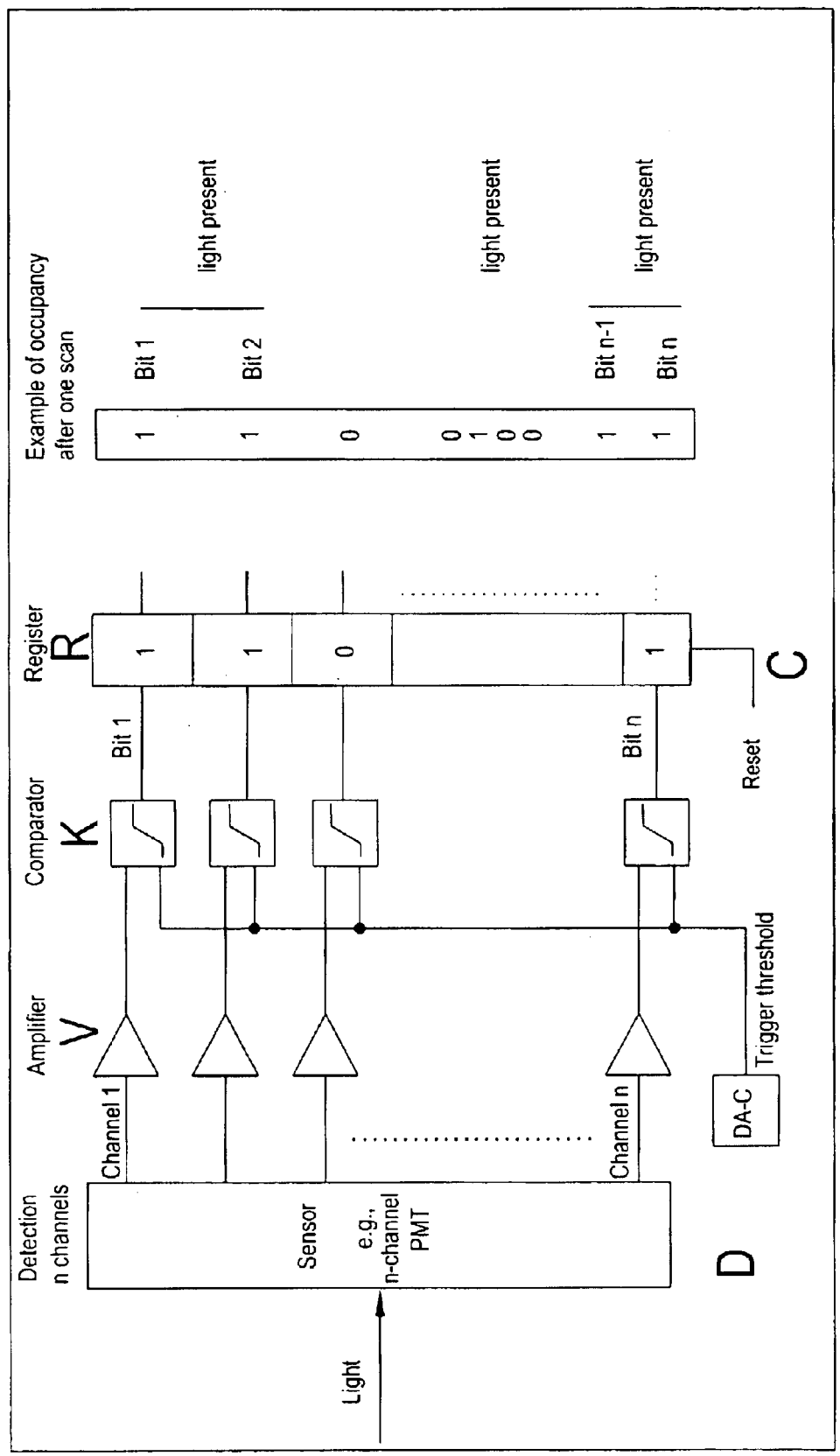
FIG. 1 illustrates a schematic block diagram of the inventive arrangement.

In an n-channel detection system D, n comparators K and triggers (one for each detection channel) whose switching thresholds are adjustable by an analog-to-digital converter are incorporated after amplification V. The threshold is adjusted so as to be above the noise level. The output of the comparators is fed in each instance to a register R which has a shared Clear input C and which can be read by a computer. Before measurement, the register (n-bit length) is reset. When a scanning pass is initiated, the comparators that switch are those which receive at their input a signal above the adjusted threshold. Channels which are arranged, e.g., in a wavelength-dependent manner and which do not send a signal above the switching threshold of the comparator are not relevant for evaluation and can be ignored or considered as a sum signal. When the comparator is constructed as a window comparator and both switching thresholds (upper and lower) are adjustable (e.g., via digital-to-analog converters), signals which are either only inside the thresholds or outside (below or above) the thresholds can be separated and evaluated.

The n channels in which data are expected can already be read off in the n-bit length register after a scan. If the detectors are in a spectral arrangement (the manner of this arrangement is optional), the register immediately sends information about the spectral components of the detected light.

This information is an important component for the correct adjustment of an n-channel system. Using this information, all channels can be adjusted to the respective wavelengths without making any subjective errors. Auto-configuration (online) of a system with respect to spectral recordings is possible. Further, there are indications for manual optimum selection (offline).

FIG. 1 shows a schematic view of the circuit. The diagram illustrates light entering an n-channel sensor (for example, an n-channel set of photo multiplier tubes). The outputs of each of the sensors are amplified (V), brought a comparator (K) and each comparator output is brought to register R which can be read by computer as discussed above.

The method according to the invention has the following advantages:

- in an n-channel detection system, information is immediately available via the active channels;
- when the n detection channels are arranged with spectral sensitivity, information about the spectral components can be displayed immediately;
- if there is a plurality of detection channels as recording channels, the repeated scanning for determining where data are available is dispensed with, i.e., reduced loading of the specimen;
- the system can automatically adjust the configuration (active channels and wavelength-dependent adjustments of filter combinations) when the active channels are known;
- the system indicates the channels in which data are expected and the wavelength at which this information allows the operator to dispense with time-consuming specimen recordings with manual adjustment of the system.

In the present invention the following features are also disclosed. The detection channel may be switched off or its amplification changed, or feedback to the light source is carried out, to change the illumination parameters or the signals of the detection channel which are not taken into consideration in further processing. A pointwise illumination and detection may be carried out. Parallel illumination and detection may be carried out. A microtiter plate may be illuminated and detected. A spectral splitting of the light emitted by the specimen may be carried out wherein a dispersive element is provided followed by a multichannel detector for spectral splitting.

While the foregoing description and drawings represent the present invention, it will be obvious to those skilled in the art that various changes may be made therein without departing from the true spirit and scope of the present invention.

What is claimed is:

1. A method for the optical detection of an illuminated specimen in a plurality of detection channels, comprising:

sensing light on a detector with multiple detection channels with an illumination light scan pass so that repeated scanning is dispensed with;

assigning an upper or lower limiting value or both values which is adjustable for each individual channel; and selecting the detection channel to be detected with respect to its mode of operation when said limiting value is reached during the illumination light scan pass.

2. The method according to claim 1, wherein the detection channel is switched off or its amplification is changed or feedback to a light source is carried out to change illumination parameters or the signals of the detection channel are not taken into consideration in further processing.

3. The method according to claim 1, including carrying out pointwise illumination and detection.

4. The method according to claim 2, including carrying out pointwise illumination and detection.

5. The method according to claim 1, including carrying out parallel illumination and detection.

6. The method according to claim 2, including carrying out parallel illumination and detection.

7. The method according to claim 5, wherein a microtiter plate is illuminated and detected.

8. The method according to claim 6, wherein a microliter plate is illuminated and detected.

9. The method according to claim 1, wherein a spectral splitting of light emitted by a specimen is carried out.

10. The method according to claim 6, wherein a dispersive element is provided followed by a multichannel detector for spectral splitting.

11. The method according to claim 1, wherein illumination is provided by laser light in a laser scanning microscope.

12. A method for controlling light to a laser scanning microscope comprising:

performing an illumination scan pass;

sending light from a specimen to a plurality of wavelength dependent detection channels and;

determining which of the detection channels have light intensity above a set threshold present wherein only the scan pass is required so that the specimen is not overloaded with light and repeated scanning is dispensed with.

13. the method of claim 12 wherein the step of determining which of the detection channels have light above a set threshold present further comprises:

sending the light from the detection channels to amplifiers to create an amplified signal;

sending the amplified signal to a threshold window comparator capable of making a comparison of the amplified signal based on a high or low threshold or both and wherein the threshold is adjustable;

not passing any amplified signal which does not meet the threshold specified in the comparator to a register while passing the remaining amplified signals to the register wherein each detection channel is represented in the register; and reading an output of register to determine if light is present in the detection channels.

* * * * *